March 23, 1965
H. O. SCHJOLIN
3,174,602
AXIALLY ENGAGING FRICTION CLUTCH
Filed July 11, 1961
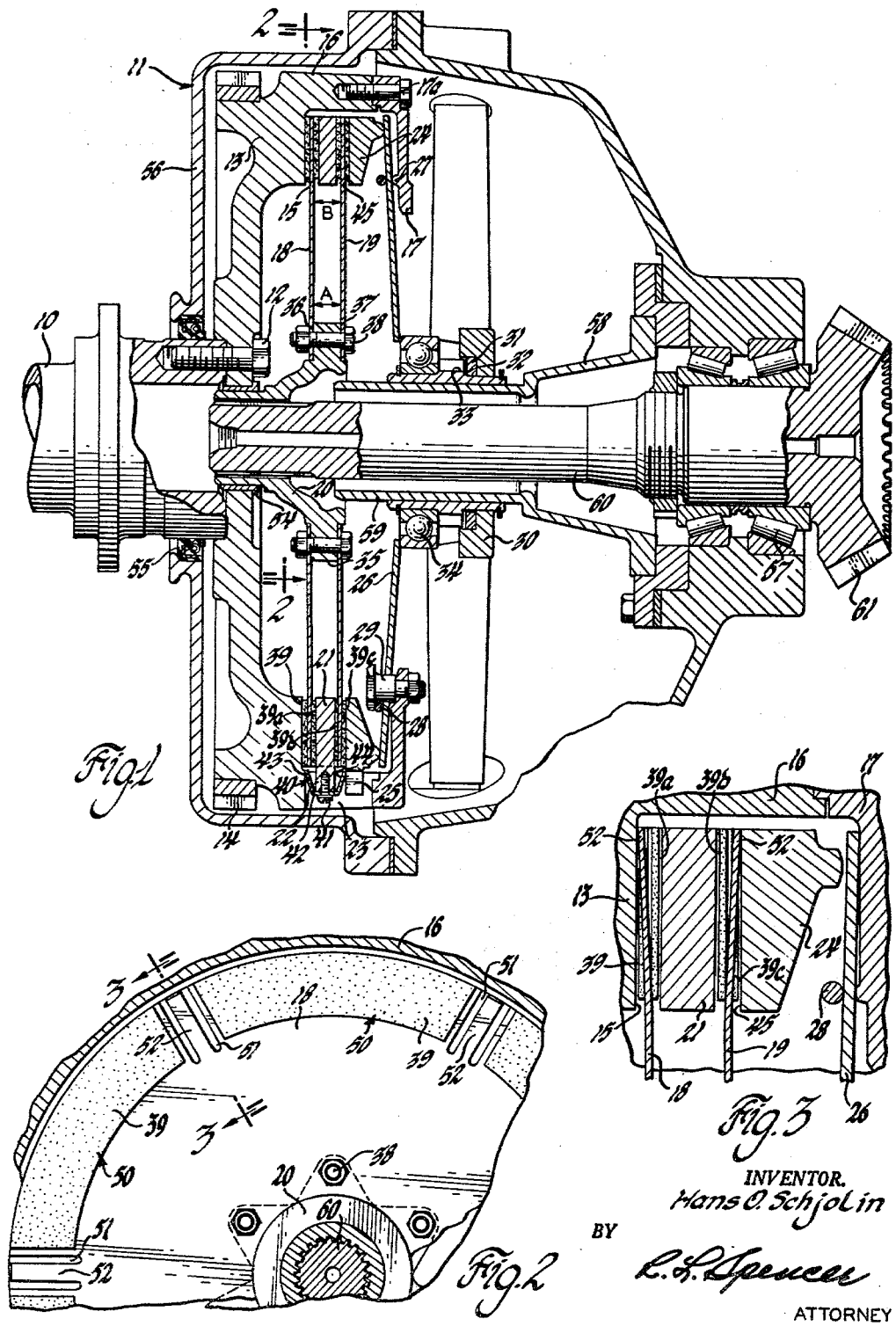
INVENTOR.
Hans O. Schjolin
BY
L. L. Spencer
ATTORNEY United States Patent Office 3,174,602
Patented Mar. 23, 1965

3,174,602
AXIALLY ENGAGING FRICTION CLUTCH
Hans O. Schjolin, Birmingham, Mich., assignor to General Motors Corporation, Detroit, Mich., a corporation of Delaware
Filed July 11, 1961, Ser. No. 123,276
1 Claim. (Cl. 192—69)

This invention relates to clutches and more particularly to an improved multiple disc clutch constructed and arranged to provide positive clutch release without drag of the discs when the clutch is in its released position.

One feature of this invention is the provision of a clutch assembly including a pair of spaced driven clutch discs rigidly fixed to a clutch hub at the radially inner portion of the discs and extending radially outwardly from the hub for engagement at the outer portion by driving members and wherein the axial spacing of the discs at the point of attachment to the hub is greater than the axial spacing of the discs at the outer zone of the discs when the discs are engaged. By this arrangement the discs normally assume a released position when the clutch is released.

Another feature of this invention is the provision of clutch discs formed of spaced segments having friction material thereon and having fingers extending outwardly in the space between the segments and offset from the plane of the discs for preventing drag of the friction surfaces when the clutch is released.

An additional feature of this invention is the provision of means automatically operable to space the driving clutch spacer plate from the driven clutch discs when the clutch is released.

These and other objects and advantages of this invention will be apparent from the following description and claim, taken in conjunction with the accompanying drawings in which:

FIGURE 1 is an assembly view with parts in section showing the clutch in its engaged position.

FIGURE 2 is a sectional view taken along the line 2—2 of FIGURE 1.

FIGURE 3 is a partial assembly view showing the clutch in its released position.

Referring to FIGURE 1, an engine driven power input shaft 10 is adapted to be selectively connected to and disconnected from a power delivery shaft 60 through a clutch designated generally at 11. Shaft 10 is secured by bolts 12 to a flywheel 13 having a starting gear 14 thereon. Flywheel 13 provides an annular driving surface or plate 15 and at its external periphery extends axially rearwardly as indicated at 16. An inwardly projecting annular support flange 17 is secured to portion 16 by means of studs 17a. A pair of driven clutch plates 18 and 19 are bolted to a hub 20 splined to power delivery shaft 60. A driving plate 21 disposed between plates 18 and 19 is splined to the axially extending portion 16 of flywheel 13 for rotation with the flywheel and for axial motion thereon by means of splines 22 on plate 21, the splines 22 mating with axially extending splines 23 on portion 16 of the flywheel. An axially movable presser plate 24 is splined to portion 16 of flywheel 13 for rotation with flywheel 13 and for axial motion with respect thereto, plate 15 having splines 25 mating with splines 23 on flywheel 13. The clutch 11 is applied by means of a Belleville spring 26 which is pivoted between an annular abutment 27 on flange 17 and an annular wire abutment 28 secured to flange 17 by a series of bolts 29. A conventional clutch release pedal (not shown) is employed to actuate a clutch release fork 30. Fork 30 may be moved axially to engage a thrust washer 31 which in turn engages a shoulder 32 of a clutch release sleeve 33, and through a thrust bearing 34 move the inner portion of spring 26 toward clutch hub 20 to release the clutch.

Referring further to FIGURE 1, it will be seen that clutch hub 20 is machined to provide an upstanding annular ring 35 having spaced shoulders 36 and 37 at opposite sides of the ring adapted to receive the inner portions of driven clutch plates 18 and 19, and that the clutch plates are mounted to the shoulders by means of a series of bolts 38 extending through the clutch plates and ring 35. Driven clutch plates 18 and 19 have friction surfaces 39, 39a and 39b, 39c, respectively, cemented to the opposite sides thereof, respectively. With the clutch engaged as illustrated in FIGURE 1, the width of the hub 20 and consequently the shoulders 36 and 37 and the inner ends of the clutch discs is greater than the space between the clutch discs in the zone of the discs adjacent intermediate presser plate 21. For example, the distance A representing the spacing of the base of the clutch discs from each other is .030 greater than the distance B representing the distance between the clutch discs in the engagement zone when the clutch is engaged. Since the clutch discs 18 and 19 are substantially flat and rigid and since the discs are rigidly secured to ring 35 at the base of the discs, the outer portion of the discs will automatically move axially away from each other as the compression force is released until such time that the dimension B is equal to dimension A and the plates extend perpendicular to their axis of rotation throughout their length.

Additionally shown in FIGURE 1 is one of a plurality of equally spaced (preferably three in number) spring clips 40 secured to intermediate presser plate 21 by a bolt 41. Each centralizing spring clip 40 includes an axially extending base member 42 extending axially across the outer periphery of a tang or spline member 22 and a pair of inwardly and axially extending spring fingers 43 and 44, the member 43 contacting surface 15 of flywheel 13 and the member 44 contacting the presser surface 45 of presser plate 24. It will readily be understood that with the clutch engaged as shown in FIGURE 1, the fingers 43 and 44 are partially compressed axially towards each other and that as the clutch is released, the radially inward ends of members 44 and 43 will move axially away from each other. With the clutch released the centralizing spring clips center the intermediate presser plate 21 with respect to clutch plates 18 and 19 so that the presser plate is out of contact with the clutch plates 18 and 19. This prevents drag of the clutch surfaces and promotes longer clutch life.

Referring to FIGURES 2 and 3, details of clutch disc 18 are shown. Clutch disc 18 is provided with a series of equally spaced openings adapted to receive the bolts 38 of FIGURE 1. At the outer radial zone of disc 18, the disc is slotted radially inwardly from its periphery to form six segments 50, having friction surfaces 39 and 39a cemented thereto. Each segment 50 is spaced from its adjacent segment by an air gap 51. In the zone between the adjacent ends of any two of the segments, radially extending tabs or fingers 52 extend radially outwardly from the disc, the tabs 52 being bent to normally lie out of the plane of disc 18. It will be understood that both clutch discs 18 and 19 are of the same construction. However, in the assembly in FIGURE 1, the disc 18 will be assembled with the offset spring fingers 52 facing surface 15 of flywheel 13, while the disc 19 will be assembled with its spring fingers facing presser plate 24. It will readily be understood that the spring fingers 52 on clutch discs 18 and 19 function to space the clutch discs from the flywheel and presser plate to prevent drag of the friction material when the clutch is released. With the clutch engaged, the tabs 52 merely bend into the plane of the disc.

In FIGURE 1, power delivery shaft 60 is splined to clutch hub 20, there being a bushing 54 between the inner end of flywheel 13 and hub 20. An oil seal 55 prevents leakage of oil between shaft 10 and the clutch housing 56. At the rear end of clutch housing 56, shaft 60 is supported in a bearing 57. Clutch release sleeve 33 is supported for axial motion on a tubular sleeve 59 having a conical end section 58 fixed to housing 56. Power delivery shaft 60 may constitute the power input shaft for either an automatic transmission or a manually shiftable gear box. In FIGURE 1, a gear 61 driven by shaft 60 represents a power input gear of a manually shiftable gear box, not shown.

The clutch arrangement described herein wherein the clutch discs are bolted to the clutch hub rather than splined thereto provides a clutch arrangement which is much more economical to manufacture than clutches of conventional design and is designed to assure a good positive clutch release when neutral or no-drive condition of operation is desired.

In FIGURE 3, the effect of the fingers 52 is shown when the clutch is released. As shown, the fingers on clutch disc 19 expand axially toward presser plate 24 to force the plate 24 out of contact with friction surface 39c. Fingers 52 on clutch disc 18 expand axially against surface 15 to separate the friction surface 39 from surface 15. The spring fingers 44 and 43 of FIGURE 1 expand axially to center the intermediate presser plate 21 between the friction surfaces 39b and 39a and out of contact therewith.

From the foregoing it will be understood that with the clutch released the clutch discs 18 and 19 will extend radially outwardly from hub 20 and will be spaced an equal distance from each other throughout their length. When engaged, the radial outer portion of the discs will be moved toward each other so that the spacing B will be less than spacing A. Upon release of the clutch the outer ends of the discs will spread apart due to the resiliency of the discs so that the distance B becomes equal to A. Also, upon release of the clutch the fingers 52 on the clutch discs 18 and 19, and extending radially outwardly between the spaced friction surfaces, will expand axially to prevent drag of the friction surfaces. In addition, fingers 43 and 44 of spring clip 40 will expand axially to center driving plate 21 between friction surfaces 39a and 39b and out of contact with these surfaces. In the assembly, three equally spaced spring clips 40 will be carried by presser plate 21. It has been found that the three anti-drag features described, namely the arrangement whereby the outer ends of the clutch discs spread apart, the fingers 52 on the clutch discs, and the spring clips 40 cooperate to assure complete and rapid clutch release without drag, thereby lengthening the useful life of the friction material. The arrangement is simple and inexpensive to manufacture and assemble. By utilizing the inherent characteristic of the plates to straighten out into a flat plane when the clutch is released and by stamping the axially offset fingers 52 on the discs, only the spring clip 40 constitutes an additional part.

What is claimed is:

A clutch assembly comprising an engine driven clutch drum, a power delivery shaft, a clutch hub fixed to said shaft for rotation therewith, a plurality of axially extending splines formed on said clutch drum, first and second axially spaced clutch discs fixed to said hub for rotation therewith as a unit and extending radially outwardly from said hub, said hub being disposed between said discs and maintaining said discs in fixed spaced axial relationship with respect to each other at their point of attachment to said disc irrespective of the condition of engagement or release of said clutch, a driving plate extending radially inwardly from said drum intermediate said clutch discs, splines on said driving plate intermeshing with said drum splines for rotating said driving plate in response to rotation of said clutch drum and for permitting axial motion of said driving plate with respect to said clutch drum, a presser plate extending radially inwardly from said drum at one side of said discs, splines on said presser plate meshing with said drum splines for driving said presser plate in response to rotation of said drum and for permitting axial motion of said presser plate with respect to said drum, manually controllable means for imparting axial motion to said presser plate to control engagement and release of said clutch, each of said clutch discs comprising a flat disc disposed in the plane of rotation of said hub, a series of spaced segments of friction material fastened to the opposite surfaces of each of said discs in the outer radial portion of each of said discs, a plurality of spring fingers formed integrally on each of said discs in the space between said friction segments, said spring fingers on said first clutch discs being bent at an angle to the plane of said friction surfaces and extending axially outwardly beyond the plane of said friction surfaces at one side only of said first disc when said clutch is released, said spring fingers on said first clutch disc being effective upon release of said clutch to bias said first disc axially toward said driving plate to position the friction surfaces on a first side of said first clutch disc in spaced relationship with respect to said clutch drum, said spring fingers on said second clutch disc being bent at an angle to the plane of the friction surfaces on said second disc and extending axially beyond the plane of said friction surfaces at one side only of said second disc when said clutch is released, said spring fingers on said second clutch disc biasing said presser plate into spaced relationship with respect to the friction surfaces on a first side of said second clutch disc when said clutch is released, the spring fingers on each of said discs being bent into the plane of the friction material on said discs when said clutch is engaged, said presser plate being effective upon engagement of said clutch to space said discs in the zone of said friction material axially towards each other such that the spacing of the discs in the zone of said hub is greater than the spacing of said discs in the zone of said friction material, and a spring clip fastened to said driving plate at the outer periphery of said driving plate and disposed in the space between the splines on said splines on said clutch drum, said spring clip comprising an axially extending base portion secured to a spline on said driving plate and first and second spring fingers, said first spring finger lying in a plane extending both axially and radially inwardly from said base portion and contacting said drum at one extremity of the splines on said drum, said second spring finger lying in a plane extending both axially and radially inwardly from said base portion into contact with the spline on said presser plate, said spring fingers reacting on said drum and said presser plate to position said driving plate in spaced relationship with respect to the friction surfaces on said clutch discs upon release of said clutch.

References Cited by the Examiner

UNITED STATES PATENTS

| 1,717,534 | 6/29 | Wemp | 192—69 |
| 2,038,016 | 4/36 | Wemp | 192—69 X |
| 2,174,240 | 9/39 | Glenney | 192—69 |
| 2,600,520 | 6/52 | Spase | 192—69 |
| 2,856,049 | 10/58 | Schjolin | 192—107 |
| 3,016,120 | 1/62 | Haussermann et al. | 192—69 X |

FOREIGN PATENTS

| 814,318 | 3/57 | France. |
| 7,848 | 1906 | Great Britain. |

DAVID J. WILLIAMOWSKY, *Primary Examiner.*

THOMAS HICKEY, *Examiner.*